Aug. 11, 1942.    R. D. MacDONALD    2,292,952
SPREADER DRIVE MECHANISM
Filed Oct. 30, 1940    2 Sheets-Sheet 1

Inventor
Raymore D. MacDonald
By Pameo Pippel
Atty.

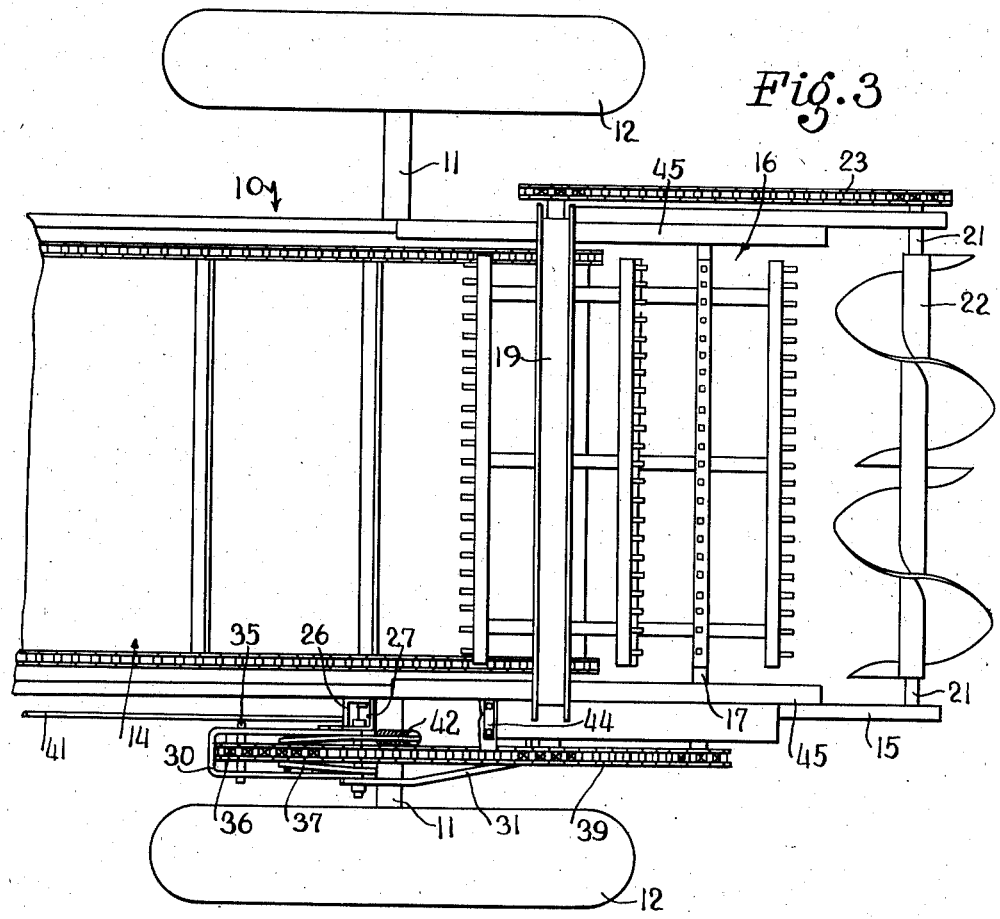
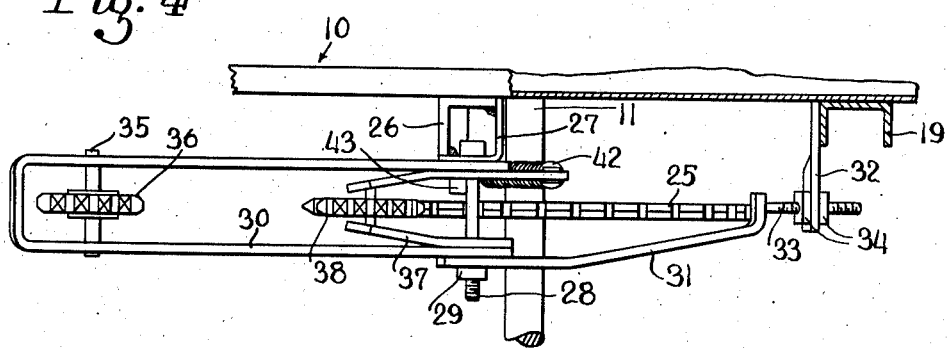

Patented Aug. 11, 1942

2,292,952

UNITED STATES PATENT OFFICE 2,292,952

SPREADER DRIVE MECHANISM

Raymore D. MacDonald, Western Springs, Ill., assignor to International Harvester Company, a corporation of New Jersey Application October 30, 1940, Serial No. 363,551

6 Claims. (Cl. 74—221)

This invention relates to a driving mechanism, and more particularly to a driving mechanism for the distributing mechanism of a material spreader. Specifically, the invention relates to adjustable mechanism carrying the driving chain for driving the spreader distributing mechanism from a sprocket driven by the spreader axle, the adjustment providing for movement of the chain so that it may be alined with the driving sprocket for facilitating engagement between the chain and sprocket.

In material spreaders of the ordinary type, the beater or distributing mechanism at the rear of the spreader body is driven through the medium of a drive chain having one run mounted for engagement with or disengagement from a drive sprocket driven by the spreader rear axle. The usual form of mechanism provided for engagement or disengagement of the chain consists of an arm or carrier mounting a portion of the chain for movement to and from the driving sprocket. One problem attendant upon such an arrangement results from the usual misalignment of the chain as respects the sprocket, so that movement of the chain for engagement with the sprocket does not always result in engagement between these two parts.

The principal object of the invention is to provide adjustable means for mounting the member which carries the chain for movement to and from the drive sprocket, this means providing for adjustment of the carrier, and consequently, for alinement of the chain within a plane including the median plane of the driving sprocket.

An important object is to provide a chain and sprocket carrier arrangement which is readily engageable with and disengageable from the driving sprocket.

Another object is to provide carrier mechanism including a chain tightening means operable to tighten the chain in either engaged or disengaged positions of the chain.

A more complete understanding of the objects and other desirable features of the invention may be had from the following detailed description taken in conjunction with the accompanying sheets of drawings; in which:

Figure 3 is a plan view of the rear portion of the spreader construction embodying the invention; and Figure 4 is an enlarged view of portions of the adjustable carrier mechanism.

Figure 1:
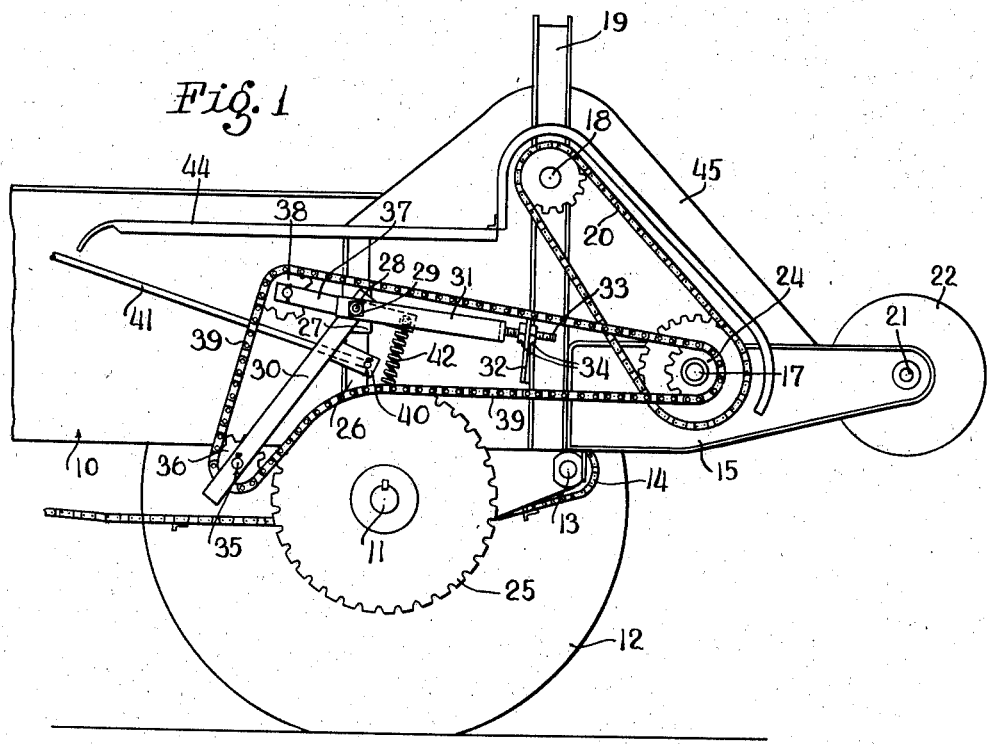
Figure 1 is a side elevational view of the rear portion of a spreader of the usual construction embodying the improved drive mechanism and showing the driving chain engaged with the driving sprocket.

As shown in Figures 1 and 3, the spreader, which may be of any conventional type, includes a main longitudinal body 10 carried on a transverse axle 11 having at its opposite ends drive wheels 12. The rear portion of the body carries a shaft 13 having transversely spaced sprockets about which is trained the usual apron 14 for moving the material toward the rear of the spreader. The rear portion of the spreader further includes a rearwardly extending supporting structure 15 adapted to carry the distributing mechanism, as generally indicated at 16.

The distributing mechanism includes a transverse shaft 17 carried in the supporting structure 15 and a second transverse shaft 18 carried in a supporting arch 19 at the rear of the spreader. Each of the shafts 17 and 18 carries a sprocket about which is trained an endless chain 20. The rearwardmost portion of the supporting structure 15 carries a third transverse shaft 21 upon which is mounted a spiral distributor 22. A drive chain 23 appropriately connects the sprocket ends of the shafts 18 and 21. The spiral distributor provides the usual wide spread attachment and the construction is in general conventional.

The driving mechanism for the distributing mechanism consists first of a first sprocket 24 carried at the outer or left-hand end of the cross shaft 17. A component part of the mechanism is a large second or driving sprocket 25 preferably keyed to or otherwise driven by the spreader rear axle 11. A rearward portion of the spreader body includes a vertical angle 26 at a midpoint of which is located a support 27. This support is formed of metal of a thickness providing a slight yieldability. The support serves to carry rigidly the inner end of a pivot member or shaft 28 which extends transversely outwardly from the left-hand side of the spreader body. The outer end of the member is provided with a threaded portion carrying a nut 29 serving to mount on the member a forwardly extending carrier member 30 and a rearwardly extending adjustable brace member 31. The lower portion of the supporting arch 19 at the left-hand side of the machine is provided with a laterally extending bracket 32 apertured to receive a threaded bolt portion 33 forming an integral part of the brace 31. A pair of lock nuts 34 threaded on the portion 33 at opposite sides of the bracket 32 provides adjustable means for securing the brace 31 to the bracket 32. Since the support 27 is yieldable, adjustment of the nuts 34 will result in movement of the outer end of the support or pivot member 28, which movement is preferably longitudinally of the spreader body.

As best shown in Figure 4, the carrier 30 is in the form of a bail having its open end pivoted on the pivot member 28. The closed end of the carrier serves to mount a cross shaft 35 carrying an idler sprocket 36. The pivot member 28 further carries a chain tightening member 37 comprising a pair of spaced arms pivoted on the pivot member and extending away therefrom and journaling a chain tightening idler 38. A driving chain 39 is trained about the first sprocket 24, the chain tightening idler 38 and the other idler 36 at the forward end of the carrier member 30. As will be readily apparent from examination of Figures 1 and 2, the forward end of the carrier, and also a portion of the chain 39, is movable vertically toward and away from the second or driving sprocket 25, movement taking place in a plane forming an extension of the median plane of said sprocket. It will be noted further that all of the sprockets are located generally in a common plane, as is also the drive chain 39.

Figure 2:
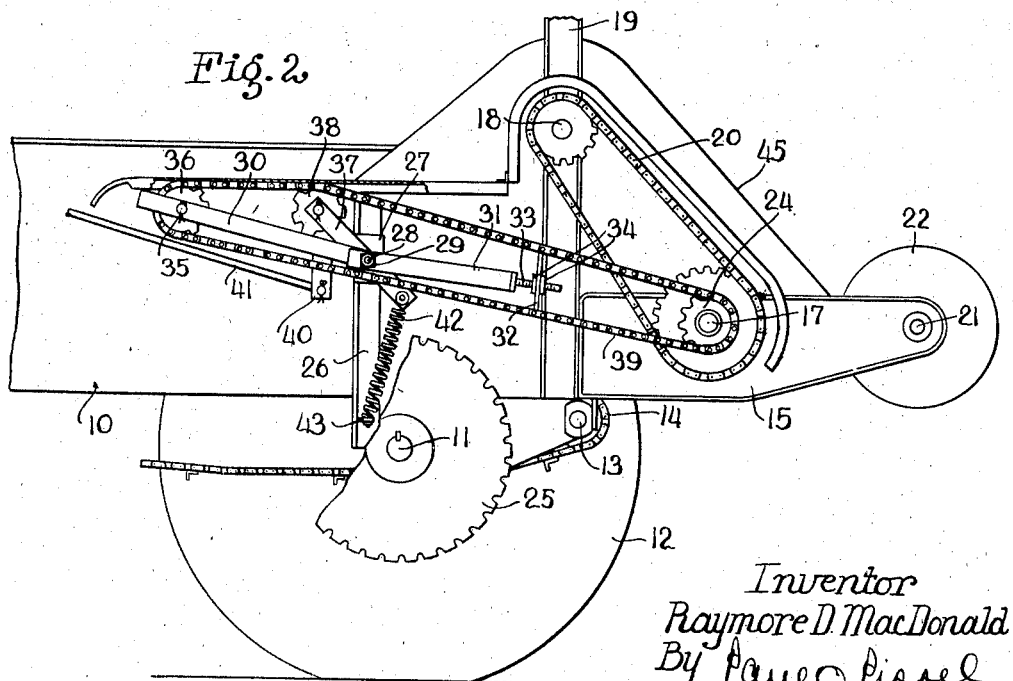
Figure 2 is a similar view showing the driving chain in disengaged position.

As previously stated, Figure 1 illustrates the position of the parts when the driving chain 39 is engaged with the drive sprocket 25. In this position of the parts, the driving sprocket 25 serves to drive the spreader distributing mechanism. When the parts assume the disengaged position, as shown in Figure 2, the operation of the distributing mechanism is cut off and the remaining spreader mechanism is free to operate independently thereof. For the purpose of engaging and disengaging the drive chain and drive sprocket, there is provided rigidly on the carrier member an arm 40 to which is pivotally connected a forwardly extending operating link 41. The forward end of this link is connected in the usual manner to operating mechanism of any suitable type, not shown.

As a further part of the chain tightening mechanism, a tension spring 42 is connected between an ear 43 on the angle 26 and a rear extension of the pivoted chain tightening member 37. It will be seen that the arrangement of the chain tightening member and spring 42 is such as to maintain tension on the chain 39 whether the chain be engaged with or disengaged from the sprocket 25. The spreader construction further includes the usual guard aprons 44 and 45, the former overlying the forward portion of the drive chain 39 and the latter serving to partially enclose the drive chain 20. Because of the arrangement of the carrier member 30, the guard apron 44 series as a stop means for limiting upward movement for the carrier member and chain when the chain is disengaged from the sprocket 25.

In the operation of the spreader the carrier member 30, together with the sprocket 36 and the forward portion of the chain 30, may be moved vertically to and from the drive sprocket 25, this movement being accomplished through the medium of the operating link 41. It will be seen that positive engagement between the chain 39 and the sprocket 25 depends entirely upon proper alinement between the parts. It has been found that continued use of the spreader results in wear of certain parts and misalinement of other parts. It accordingly results that proper alinement between the chain 30 and the sprocket 25 cannot always be accomplished. According to the present invention, the adjustable means comprising the adjustable brace 31 compensates for misalinement by providing for adjustment of the pivot member 28. This member 28 extends outwardly from the spreader body generally at right angles to the common plane of the sprockets. The carrier member 30 extends generally in this plane. It will be seen that forward or rearward movement of the pivot member 28 results in movement of the carrier member crosswise of the aforesaid plane. A very slight adjustment of the nuts 34 results in rather wide movement of the forward end of the carrier member. This adjustment is sufficient to compensate for any misalinement of the parts, and any existing misalinement may be readily corrected, thus facilitating proper engagement between the chain 39 and the sprocket 25. The proper position being once obtained, it may be maintained by locking the nuts 34 in place.

From the foregoing description it will be seen that an improved driving mechanism has been provided for a distributing mechanism of a material spreader. It will be understood, of course, that only a preferred embodiment of the invention has been illustrated and that numerous changes or modifications and alterations may be made therein without departing from the spirit and scope of the invention as defined in the appended claims.

What is claimed is:

1. A drive mechanism comprising, in combination, a support, first and second rotatable members carried on the support generally in the same plane and having spaced axes of rotation, pivot means carried by the support on an axis generally paralleling the axes of rotation of the rotatable members and intersecting the aforesaid plane substantially at right angles, a swingable member carried at one end by and extending generally at right angles from the pivot means and having its free end swingable through the aforesaid plane toward and from the second rotatable member, an endless drive means trained about the first rotatable member and the free end of the swingable member, whereby swinging movement of said swingable member engages or disengages the drive means and the second rotatable member, and means adjustable between the support and the pivot means for positioning the pivot means at optional angles to the aforesaid plane for moving the free end of the swingable member crosswise of the plane to facilitate alinement of the endless drive means with the second rotatable member.

2. A drive mechanism comprising, in combination, a support, first and second sprockets carried by the support generally in the same plane and journaled on spaced, parallel axes, a shaft intersecting the aforesaid plane and forming a pivot generally paralleling the aforesaid axes, means carrying said shaft for adjustment on the support, a sprocket carrier pivoted on said shaft for limited swinging movement toward and away from the second sprocket, a third carrier journaled in said carrier, a second sprocket carried pivotally on said shaft and including a fourth sprocket, resilient means engaging and urging the second carrier away from the second sprocket, and a drive chain trained about the first, third, and fourth sprockets and having one run thereof adapted for engagement with the second sprocket, swinging movement of the first carrier and its sprocket moving the chain into and out of engagement with the second sprocket.

3. In a material spreader having a longitudinal body including wheels and distributing mechanism, a drive sprocket carried on a transverse axis and rotated by a wheel, a sprocket carried on a transverse axis for driving the distributing mechanism, and a carrier member having opposite end portions, the combination with the carrier of a yieldable support including a pivot on a transverse axis carrying the carrier at one end on the spreader body, the other end of the carrier being swingable about said pivot toward and away from the drive sprocket, a drive chain trained about the distributing mechanism sprocket and carried by the carrier, a portion of said chain being swingable with the free end of the carrier toward and away from the drive sprocket for optional engagement with and disengagement from said sprocket, and an adjustable brace member connected between the spreader body and the carrier pivot for moving said pivot on the yieldable support longitudinally with respect to the spreader body.

4. In a material spreader having a longitudinal body including wheels and distributing mechanism, a drive sprocket carried on a transverse axis and rotated by a wheel, a sprocket carried on a transverse axis for driving the distributing mechanism, and a carrier member having opposite end portions, the combination with the carrier of a yieldable support including a pivot on a transverse axis carrying the carrier at one end on the spreader body, the other end of the carrier being swingable about said pivot toward and away from the drive sprocket, an idler on the swingable end of the carrier, a drive chain trained about the distributing mechanism sprocket and the idler, a portion of said chain being swingable with the free end of the carrier toward and away from the drive sprocket for optional engagement with and disengagement from said sprocket, a chain-tightening member carried on the pivot, and an adjustable brace member connected between the spreader body and the carrier pivot for moving said pivot on the yieldable support longitudinally with respect to the spreader body.

5. In a material spreader including a longitudinal body having a transverse axle, wheels on the axle, distributing mechanism, a driving sprocket carried on a transverse axis and driven by a wheel, a driven sprocket carried on a transverse axis spaced rearwardly of the driving sprocket and connected to the distributing mechanism, a carrier member extending forwardly alongside the body above the driving sprocket, a third sprocket journaled at the forward end of the carrier, and a drive chain trained about the driven and third sprockets and having its lower run disposed above and generally in the median plane of the driving sprocket, the combination with the carrier of a transverse shaft pivotally mounting the rear end of the carrier and spaced above the driving sprocket and forwardly of the driven sprocket and having inner and outer ends, whereby the forward end of said carrier and the lower run of the drive chain are movable vertically together toward and away from the driving sprocket for engaging and disengaging said lower run and the driving sprocket, yieldable means carrying the inner end of the shaft on the spreader body, and adjustable means normally securing the outer end of the aforesaid shaft and adjustable to move the outer end of said shaft forwardly or rearwardly of the body.

6. In a material spreader including a longitudinal body having a transverse axle, wheels on the axle, distributing mechanism, a driving sprocket carried on a transverse axis and driven by a wheel, a driven sprocket carried on a transverse axis spaced generally longitudinally of the driving sprocket and connected to the distributing mechanism, a carrier member extending alongside the body, a third sprocket journaled at one end of the carrier, and a drive chain trained about the driven and third sprockets and having its lower run disposed adjacent and generally in the median plane of the driving sprocket, the combination with the carrier of a transverse shaft pivotally mounting the other end of the carrier and spaced from the driving sprocket and having inner and outer ends, whereby the sprocket-carrying end of said carrier and the lower run of the drive chain are movable together toward and away from the driving sprocket for engaging and disengaging said lower run and the driving sprocket, yieldable means carrying the inner end of the shaft on the spreader body, and adjustable means normally securing the outer end of the aforesaid shaft and adjustable to move the outer end of said shaft forwardly or rearwardly of the body.

RAYMORE D. MacDONALD.

CERTIFICATE OF CORRECTION.

Patent No. 2,292,952.　　　　　　　　　　　　　　　　　August 11, 1942.

RAYMORE D. MACDONALD.

It is hereby certified that error appears in the printed specification of the above numbered patent requiring correction as follows: Page 2, second column, lines 66 and 67, for "third carrier journaled in said carrier, a second sprocket" read --third sprocket journaled in said carrier, a second carrier--; and that the said Letters Patent should be read with this correction therein that the same may conform to the record of the case in the Patent Office.

Signed and sealed this 29th day of September, A. D. 1942.

Henry Van Arsdale,
(Seal)　　　　　　　　　　　　　　　　Acting Commissioner of Patents.